Dec. 27, 1955  I. W. COX  2,728,830
EXPANSIBLE POWER ELEMENTS
Filed April 17, 1953

Inventor
Irvin W. Cox
By W. E. Bryon
Attorney

United States Patent Office 2,728,830
Patented Dec. 27, 1955

2,728,830

EXPANSIBLE POWER ELEMENTS

Irvin W. Cox, West Allis, Wis., assignor to Cutler-Hammer, Inc., Milwaukee, Wis., a corporation of Delaware Application April 17, 1953, Serial No. 349,510

15 Claims. (Cl. 200—140)

This invention relates to expansible power element devices and methods of making the same.

A primary object of the invention is to provide improved elements of the aforementioned character.

Power elements, especially those used in temperature control of refrigerators and the like, usually comprise a diaphragm or bellows device and a tube leading therefrom. The expansive motion of the power element resulting from change in the temperature and/or pressure of the thermometric fill within the diaphragm and tube is utilized to effect actuation of a control switch. Bilaterally expansible power elements inherently provide for greater expansive motion than do unilaterally expansible types of similar size, but are usually more difficult and costly to mount in a manner to utilize such increased motion than are the unilateral types.

Accordingly, another object of the invention is to provide such power element devices which are inexpensive to manufacture and to mount.

Another object is to provide a unitary power element device.

Another object is to provide bilaterally expansible power element devices in which minimum strain is developed at the junction of the tube and the diaphragm by expansive motion of the latter.

A further object is to provide means employing such power element devices for actuating switches.

Other objects and advantages of the invention will hereinafter appear.

The accompanying drawings illustrate certain embodiments of the invention which will now be described, it being understood that certain modifications with respect to structural details may be made in the embodiments illustrated without departing from the spirit or scope of the invention as defined by the appended claims.

Figure 1:
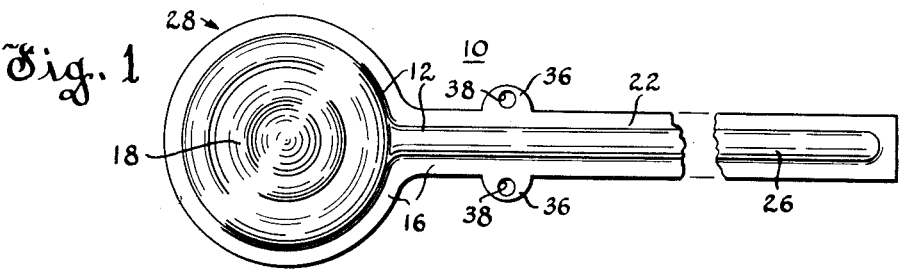
Figure 1 is a plan view of a power element device embodying the invention.
Figure 2:
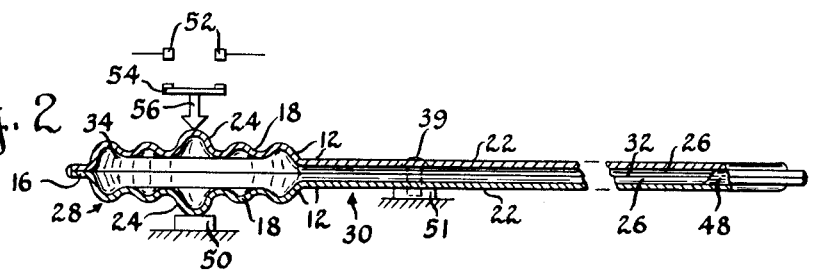
Fig. 2 is a partly schematic and partly cross-sectional illustration of a switch actuating system employing the power element device shown in Fig. 1.

Referring to Figs. 1 and 2 of the drawings, the numeral 10 generally designates a power element device comprising a pair of like combined diaphragm and stem members 12, 12 assembled in back-to-back relationship and joined together along an endless seam 16 as by welding. Members 12, 12 each have a diaphragm disc portion 18 and a stem portion 22. Each diaphragm disc portion 18 has a central boss 24 and each stem portion 22 is formed to provide therein a longitudinal groove 26; the grooves 26, 26 jointly communicating with the respective diaphragm disk portions 18, 18.

When the members 12, 12 are assembled as illustrated in Fig. 2, diaphragm disc portions 18, 18 jointly provide a bilaterally expansible diaphragm 28, and the stems 22, 22 form a cantilever 30 having a channel 32 therein closed at one end and communicating at its other end with the interior 34 of the diaphragm 28.

The stems 22, 22 and thus also the assembled cantilever 30, are provided, as shown, with ears 36 formed integrally therewith at some preselected distance from the diaphragm 28. These ears have alined openings 38 therein respectively which are adapted to accommodate any suitable fastening means, such as screws or bolts 39.

Figure 3:
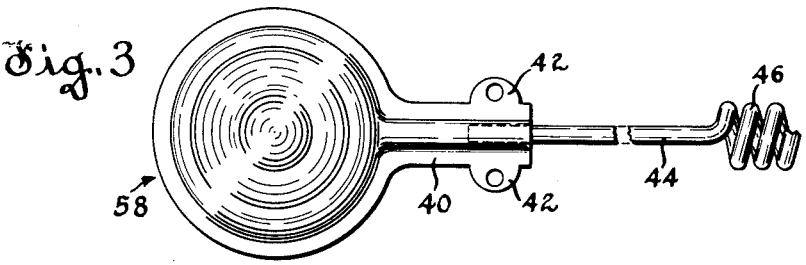
Fig. 3 is a plan view of an alternative form of a power element device embodying the invention.
Figure 4:
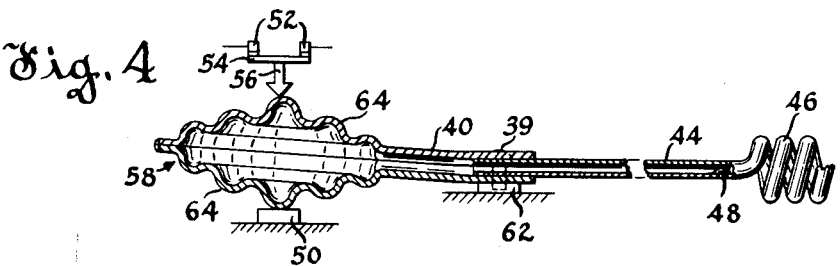
Fig. 4 is a partly schematic and partly cross-sectional illustration of a switch actuating system employing the power element device shown in Fig. 3.

The embodiment illustrated in Figs. 3 and 4 employs a power element device like that shown in Figs. 1 and 2 except that the stem portions forming the cantilever 40 terminate at some suitable or desired length beyond the ears 42. A tube 44, having one end closed or sealed in any well known manner and one end open, has its open end inserted in the channel or passage at the outer end of the cantilever 40 and may be considered part of the cantilever. The opposite end portion of the tube may be coiled as shown at 46 to provide, in effect, a bulb.

The power element devices illustrated are each provided with a thermometric fill 48 such as a saturated vapor and its liquid. The diaphragms expand and contract in accordance with the temperature of the liquid or the pressure exerted by the vapor.

Diaphragm 28 is shown in a relatively unexpanded state in Fig. 2. The boss 24 of the lower diaphragm disc 18 engages a surface or stop 50 which is fixed relatively to the mounting surface 51 for ears 36 and to a switch device represented by contacts 52 and bridging contactor 54. Means 56 connecting the boss 24 or face of the upper diaphragm disc 18 with the bridging contactor 54 are provided to transmit the expansive motion of diaphragm 28 for actuation of the switch, in a manner like that illustrated in Fig. 4.

Diaphragm 58 (see Fig. 4) is shown in expanded condition. The cantilever 40 cantilevers about its fixed point 62 through an arc determined by the expansion of lower diaphragm disc 64. The diaphragm 58 tends to act as part of the cantilever system, thus reducing the strain at the junction of the diaphragm 58 and the cantilever 40. While not essential, it is considered preferable that the stem portions be formed integrally with their respective diaphragm discs.

The diaphragm discs 18 and 64 may be convoluted according to the force-displacement characteristic required. A central boss may be provided as in the diaphragm discs illustrated to insure uniform transmission of the expansive motion of the diaphragm.

While the power element devices illustrated are provided with mounting ears, it will be apparent that such ears may be omitted and other means provided for mounting the devices. Such means might be a part or parts of the power element device or might comprise separate devices.

The fill may be introduced into the power element device by completing the same except for sealing the cantilever 30 or the tube 44 and then placing the power element device, or at least its unsealed portion, in an atmosphere of thermometric fill wherein the unsealed portion is sealed in any well known manner. Some of the fill will be sealed within the element. A predetermined amount of fill may be so introduced by maintaining the fill atmosphere at some preselected ambient breaking point pressure and temperature. The manner of selecting such breaking point pressure and temperature is well known in the art.

The power element device illustrated in Figs. 3 and 4 may be made by completing the same except for attaching the tube 44 to cantilever 40 and then placing at least the open end of tube 44 and cantilever 40 in an atmosphere of thermometric fill. The open end of the tube 44 is then inserted within the outer, open end of the cantilever 40 and the end of the cantilever is crimped over the end of the tube. Finally the tube and cantilever are bonded together as by soldering or welding. Or, as will be apparent to those skilled in the art the power element device may be completed except for sealing the outer end of the tube 44. Then such outer end is placed in an atmosphere of fill where it is sealed.

While I have illustrated and described power element devices in which the expansive portions are of diaphragm form it will be readily understood that such expansive portions may also take the form of a bellows.

I claim:

1. A power element device comprising a bilaterally expansible power element and a cantilever extending laterally therefrom, said cantilever having formed therein a passage communicating with the interior of said power element.

2. A power element device as defined in claim 1 in which said cantilever is integrally formed with said power element.

3. A power element device comprising a bilaterally expansible power element and a cantilever extending laterally from said power element and having one end secured thereto, said cantilever having formed therein a passage extending throughout the length thereof and communicating with the interior of said power element.

4. The method of making a power element from preformed parts which comprises joining said parts in an atmosphere of expansible vapor fill having pre-selected pressure and temperature characteristics to form a hollow, vapor filled, thermally expansible power element.

5. The method of making an expansible power element from a plurality of preformed parts which comprises joining the parts to form a hollow element and sealing the hollow element in an atmosphere of expansible vapor fill, said atmosphere having pre-selected pressure and temperature characteristics.

6. A power element device comprising a bilaterally expansible power element and a cantilever extending laterally from said diaphragm and having one end secured thereto, said cantilever having formed therein a passage communicating with the interior of said power element and being adapted at a portion removed from said one end for fixed securement to a suitable support whereby said power element may be cantilevered about said portion when secured.

7. A power element device as defined in claim 6 wherein the other end of said cantilever is sealed.

8. A power element device as defined in claim 6 wherein the other end of said cantilever is sealed to provide a sealed unit, and a thermometric fill disposed within said unit.

9. A power element device as defined in claim 6 including a tube sealed at one end and at its other end attached to said cantilever to form a continuous sealed passage extending from within said power element to the sealed end of said tube, and a thermometric fill disposed within said power element device.

10. Actuating means for electric switches comprising a bilaterally expansible power element and a cantilever extending laterally from said power element and having one end secured thereto, said cantilever having formed therein a passage communicating with the interior of said power element and being adapted at a portion removed from said one end for fixed securement to a suitable support whereby said power element may be cantilevered about said portion when secured, means including said support having fixed mounting relatively to said switch to fixedly secure said portion and to engage one face of said power element, and means engageable with the other face of said power element to transmit expansive motion of said power element for actuation of said switch.

11. Actuating means as defined in claim 10 wherein the other end of said cantilever is sealed to provide a sealed unit, and a thermometric fill disposed within said unit.

12. Actuating means as defined in claim 10 including a tube sealed at one end and attached to said cantilever at its other end to form a continuous sealed passage extending from within said power element to the sealed end of said tube, and an expansible fill within said power element.

13. A power element comprising a pair of like combined diaphragm and stem members each having a diaphragm disc and a longitudinally indented stem extending laterally therefrom and formed integrally therewith and each being adapted at a portion of said stem removed from said diaphragm disc for fixed securement to a suitable support, said members being disposed in back-to-back relation and welded together by a continuous seam to provide a bilaterally expansible diaphragm and an integrally formed cantilever extending laterally therefrom.

14. A power element as defined in claim 13 in which said members are welded together by an endless seam to provide a sealed unitary element.

15. The method of making a power element device comprising a bilaterally expansible power element, a cantilever extending laterally therefrom, said cantilever having formed throughout the length thereof a passage communicating with the interior of said power element and a tube sealed at one end comprising the steps of placing the open end of said cantilever and the open end of said tube in an atmosphere of the thermometric fill, inserting said open end of said tube within the open end of said cantilever, crimping said open end of said cantilever about said tube, and bonding said tube and said cantilever in the region of the crimped portion of said cantilever.

References Cited in the file of this patent

UNITED STATES PATENTS

| 1,718,980 | Ringwald | July 2, 1929 |
| 2,203,841 | Persons | June 11, 1940 |
| 2,328,406 | Atchison | Aug. 31, 1943 |
| 2,569,410 | De Craene | Sept. 25, 1951 |